Nov. 21, 1961   W. E. GILLASPIE   3,009,222
ATTACHING FASTENER FOR MOLDING STRIP
Filed March 16, 1960
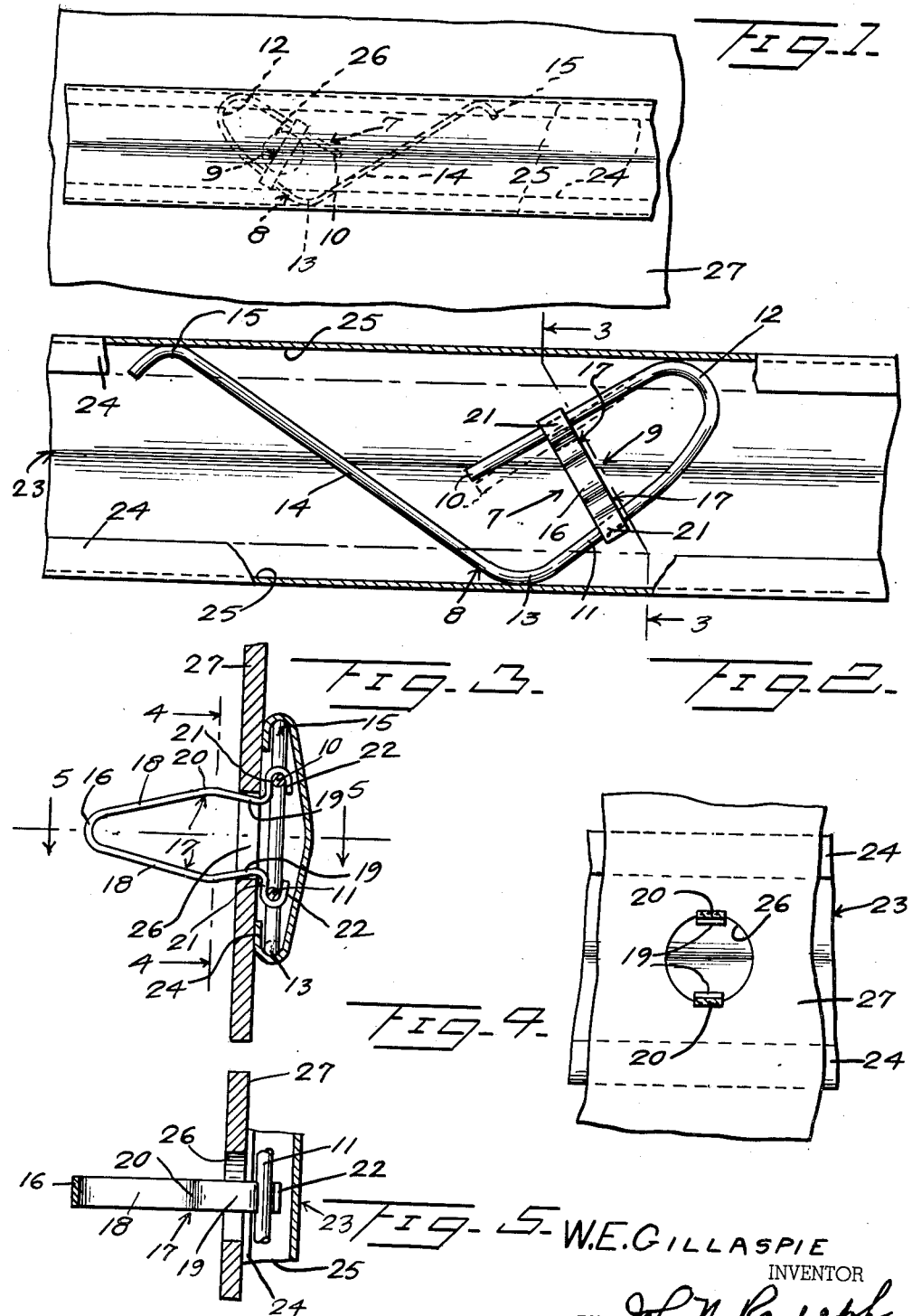
W.E. GILLASPIE
INVENTOR
BY John N. Randolph
ATTORNEY

United States Patent Office 3,009,222
Patented Nov. 21, 1961

3,009,222
ATTACHING FASTENER FOR MOLDING STRIP
William E. Gillaspie, 2204 Juniata Gap Road,
Altoona, Pa.
Filed Mar. 16, 1960, Ser. No. 15,319
4 Claims. (Cl. 24—73)

This invention relates to a fastener for attaching molding strips or trim strips to panels and more particularly to a fastener for attaching or re-attaching molding strips or trim strips to automobile bodies.

Ornamental molding strips and trim strips of vehicle bodies are provided with internal channels along longitudinal edges thereof in which an anchoring member of a fastening is received and detachably secured for connecting the attaching fastener to a molding strip. Such attaching fasteners additionally include a stud projecting from the anchoring member and which engages through an opening in the vehicle body or panel for securing the attaching fastener to the panel for thus connecting the molding strip to the panel. The anchoring members of such attaching fasteners are constructed to fit molding strips of different widths and so that such attaching fasteners can be adjusted lengthwise in the molding strips to assume proper positions so that the stud thereof will align with the panel or body opening. Such attaching fasteners also conventionally include studs in the form of resilient clips or snap-type fasteners capable of being readily attached to or detached from a body portion or panel through an aperture thereof.

The present invention contemplates all of the aforementioned advantages of attaching fasteners for molding strips, and it is an additional and primary object of the present invention to provide a unique construction of anchoring member for attachment to the channels of a molding strip and which cooperates in a unique manner with a conventional form of snap-in type stud or spring clip, to enable said spring clip or stud to fit panel or body openings of different sizes, to have a snug fitting engagement therein, and not to be broken, deformed or otherwise damaged by insertion through such panel opening, even where the panel opening is undersized for the particular spring clip or snap-in stud.

Still a further object of the invention is to provide an attaching fastener which may be very economically manufactured and sold, which will be extremely efficient and durable, and which can be readily reshaped without the use of tools, to accommodate the anchoring member of the attaching fastener to molding strips of different widths as well as to molding strips which are relatively flat or deeply recessed.

Various other objects and advantages of the invention will hereinafter become more fully apparent from the following description of the drawing, illustrating a presently preferred embodiment thereof, and wherein:

FIGURE 1 is a fragmentary elevational view looking toward the outer side of a portion of a vehicle body and showing a part of a conventional molding strip or trim strip attached thereto by one of the attaching fasteners;

FIGURE 2 is an enlarged side elevational view, partly broken away or in section, looking toward the inner side of a portion of a molding strip and showing the attaching fastener applied thereto;

FIGURE 3 is a sectional view taken substantially along the line 3—3 of FIGURE 2 and showing the spring clip of the attaching fastener engaging a portion of a vehicle body through an opening thereof;

FIGURE 4 is a fragmentary sectional view taken substantially along a plane as indicated by the line 4—4 of FIGURE 3, and FIGURE 5 is a fragmentary sectional view taken substantially along a plane as indicated by the line 5—5 of FIGURE 3.

Referring more specifically to the drawing, the attaching fastener in its entirety and comprising the invention is designated generally 7 and is composed of an anchoring member, designated generally 8, and a spring clip or snap-in type stud, designated generally 9.

The anchoring member 8 is formed from a single elongated strand of heavy gauge tempered wire which may be of any desired cross sectional shape. One end portion of the strand is bent to provide transversely spaced legs 10 and 11 which are connected to one another by a rounded bend 12. The leg 11 is somewhat longer than the leg 10 and terminates at the end thereof, remote from the bend 12, in a bend 13 by which the leg 11 is connected to a long straight portion 14 of the strand which is provided at its distal end with an outwardly turned back terminal portion 15, constituting the other terminal of the strand. The distal end of the leg 10, which forms the first terminal of the strand, is spaced from the part of the spring arm 14 which extends thereacross. The legs 10 and 11 and the bends 12 and 13 form a base portion of the anchoring member 8. The strand forming the anchoring member 8 may be bent and reshaped with the fingers and without the use of a tool and said strand is sufficiently resilient so that the leg 10 may yield toward the leg 11 and will be spring urged back to its original position.

The spring clip or snap-in type resilient stud 9 is of conventional construction and is formed from a single elongated strip of spring metal which is bent back upon itself intermediate of its ends to form a rounded forward end or point 16, from which projects two corresponding legs 17 having portions 18 which extend in diverging relation to one another from the rounded point 16. The legs 17 also include end portions 19 which extend in converging relation to one another from the divergent ends of the portions 18. The merging ends of the portions 18 and 19 of the legs 17 constitute rounded outer portions 20 which are spaced apart a greater distance than the other portions of said legs. The strip forming the clip or stud 9 has outturned portions 21 which extend away from one another from the convergent inner ends of the leg portions 19 and which terminate in outwardly turned back terminal hooks 22 which open toward one another and which are disposed on the sides of the portions 21 which are remote from the legs 17, as seen in FIGURE 3.

Before assembling the parts 8 and 9 to form the fastener 7, the leg 10 is bent or deformed away from the leg 11 so that the spacing between the legs 10 and 11 will be slightly greater than the spacing between the outermost portions of the hooks 22. The hooks 22 may then be slidably applied to the legs 10 and 11 over the bend 12, as seen in FIGURES 2 and 3, and portions of the legs 10 and 11 will engage yieldably in said hooks 22 with the leg 10 sprung slightly toward the leg 11 and thus maintained under strain to a limited extent to hold the clip or stud 9 attached to the anchoring member 8.

All parts of the anchoring member 8 are disposed substantially coplanar, as seen in FIGURE 4. The base portion of the anchoring member 8, that is, the portion between the bends 12 and 13, may be inserted into a conventional molding strip 23 through the open recessed inner side thereof between the substantially coplanar spaced flanges 24 which form parts of the channels or grooves 25 which extend along the longitudinal edges of said molding strip. The bend 12 may be inserted under one of the flanges 24 and into the groove 25 thereof, after which the anchoring member 8 may be twisted slightly and rocked to insert the bend 13 in the other channel 25. The spring arm 14 is then flexed away from the terminal of the leg 10 and thereafter moved laterally so that the terminal portion 15 can be inserted into the channel 25 in which the bend 12 is received, as illustrated in FIGURE 2. As previously stated, the anchoring member 8 can be reshaped with the fingers to vary the spacing between the bends 12 and 13 to accommodate the base portion of the anchoring member to molding strips of different widths and the spring arm 14 can be bent toward or away from the leg 10 to vary the angle formed by said spring arm and the leg 11, so that when the terminal 15 is in engagement with the channel 25, as seen in FIGURE 2, the spring arm 14 will be placed under strain to hold the portion 15 and the bend 12 in tight engagement with the upper channel 25 and the bend 13 in tight engagement with the lower channel 25.

With the anchoring member 8 thus applied to the molding strip 23, the spring clip or snap-in stud 9 will project outwardly from said molding strip between the flanges 24, and by adjusting the spring clip 9, longitudinally of the legs 10 and 11, the spacing of the clip 9 relative to the flanges 24 can be varied.

The clip 9 is engaged through an opening 26 of a body portion or panel 27 for attaching the molding 23 to the outer side thereof. The opening 26 is of a diameter greater than the rounded point 16 of the clip but less than the spacing between the legs 17 at their most remote portions 20. The pointed end 16 of the clip constitutes the leading end thereof which is inserted from right to left, as seen in FIGURE 3, through the opening 26. As the portions 18 of the legs 17 move through the opening 26 and assume diametrically opposite portions of the wall of said opening, the legs 17 must yield toward one another to permit the leg portions 20 to pass through the opening. The legs 10 and 11 of the anchoring member cooperate with the spring clip 9 in accomplishing this function since the free ends of the clip legs 17 together with the hooks 22 may be sprung toward one another due to the fact that the leg 10 of the anchoring member can be sprung toward the leg 11, as seen in dotted lines ni FIGURE 2, to reduce the space between the leg portions 20 without said portions 20 being bent or deformed inwardly. Further, after the portions 20 have passed from right to left through the opening 26, the leg 10 will spring back toward its full line position of FIGURE 2 to yieldably spread the clip legs 17 so that the portions 19 thereof will then tightly engage in the opening 26. As said portions 19 are disposed in slightly converging relation to one another from the portions 20, the portions 19 will have a camming action with the body portion 27 tending to draw the clip from right to left through the opening 26 and which will draw the flanges 24 titghtly against the outer or right-hand side of the body portion 27 and the portions 12, 13 and 15 tightly against the inner sides of the flanges 24, to retain the molding strip 23 immovable relative to the panel or body portion 27 and the fastener 7 immovable relative to both said body portion and the molding strip.

Where the opening 26 is slightly undersized, as frequently occurs, the ability of the legs 17 to be sprung toward one another, by yielding of the leg 10 toward the leg 11, will prevent the clip legs 17 from being deformed in passing through the opening 26 as frequently occurs when the hook members 22 are connected to parts of an anchoring member so that said hook members cannot yield toward one another. When this occurs, the clip legs are frequently deformed to such an extent that the legs do not have a gripping engagement with the panel or body opening. In addition, the ability of the clip legs 17 to spring toward one another while attached to the anchoring member will enable the fastening 7 to be applied and removed any number of times without damaging the clip 9 and without affecting the utility of said fastening 7.

Various modifications and changes are contemplated and may be resorted to, without departing from the function or scope of the invention as hereinafter defined by the appended claims.

I claim as my invention:

1. A fastener for attaching a molding strip or trim strip to a body portion or panel comprising, in combination with a spring clip formed from a single strand of spring metal bent back upon itself intermediate of its ends to form a rounded point, said clip including corresponding legs extending from said point, inwardly opening hooks constituting terminals of said strip and forming extensions of ends of said clip legs, said clip legs being bowed outwardly relative to one another intermediate of their ends; an anchoring member comprising a single strand of heavy gauge resilient wire including three spaced portions adapted to detachably engage in inwardly opening channels of a molding strip for detachably securing said anchoring member to the molding strip, said anchoring member including spaced legs embraced by the hooks of said spring clip for attaching the spring clip to the anchoring member, one of said legs of the anchoring member constituting a terminal portion of the strand and being spaced from said other leg of the anchoring member such that the hooks yieldably engage the anchoring member legs, and said first mentioned leg of the anchoring member being sprung toward the other anchoring member leg to allow the clip legs to be sprung toward one another and for normally holding the clip legs spread, said anchoring member including an elongated spring arm extending between two of said channel engaging portions, said spring arm forming an extension of and being disposed at an angle to said other leg of the anchoring member and being capable of being bent toward or away from the first mentioned leg of the anchoring member for adjusting the position of one of said spaced portions to the other two spaced portions for accommodating the anchoring member to molding strips of different widths and to apply strain to the spring arm when said spaced portions are in engagement with the molding strip channels.

2. An attaching fastener for a molding strip or trim strip comprising an anchoring member formed from a single strand of resilient wire and a spring clip formed from a single strip of resilient metal, said anchoring member including two spaced legs, one of said legs constituting a terminal portion of said strand and being yieldably displaceable toward said other leg; said strip forming the spring clip having opposed inwardly opening hooks constituting terminals of said spring clip disposed to yieldably embrace said legs of the anchoring member, said clip including corresponding legs extending from said hooks, a rounded clip portion forming a part of said strip and integrally connecting said legs at the ends thereof disposed remote from said hooks, said clip legs being bowed outwardly relative to one another intermediate of their ends, said one leg of the anchoring member being displaceable toward the other anchoring member leg by displacement of the hooks and clip legs toward one another to reduce the spacing between said clip legs, said anchoring member having a channel engaging portion at each end of said other leg and a third channel engaging portion constituting the other terminal of the strand, said strand including a portion extending between said other leg and the third channel engaging portion and constituting an angularly adjustable spring arm for adjustably and yieldably positioning the third channel engaging portion relative to the first mentioned channel engaging portions.

3. An attaching fastener for a molding strip comprising a spring clip formed from a single strip of resilient metal bent upon itself intermediate of its ends to form a rounded point, said clip having corresponding legs extending from said point and having opposite ends terminating in inwardly opening outwardly offset opposed hooks, said hooks constituting terminals of said strip, said legs having intermediate portions outwardly bowed relative to one another; an anchoring member comprising a resilient strand having a U-shaped end defining an elongated base, said base being yieldably compressible transversely thereof and having a channel engaging portion at each of its ends, said hooks straddling and embracing the base, said base normally exerting an expansive force against the hooks for holding the clip legs spread and being compressible to permit the clip legs to be sprung toward one another, the other end of said strand defining a spring arm extending from one of said channel engaging portions and disposed at an angle to the base and terminating in a third channel engaging portion, said third channel engaging portion being adjustably and yieldably supported by said spring arm relative to the first mentioned channel engaging portions.

4. A fastener for attaching a molding strip or trim strip to a body portion or panel comprising, in combination with a spring clip formed from a single strand of spring metal bent back upon itself intermediate of its ends to form a rounded point, said clip including corresponding legs extending from said point, inwardly opening hooks constituting terminals of said strip and forming extensions of ends of said clip legs, said clip legs being bowed outwardly relative to one another intermediate of their ends; an anchoring member comprising a single strand of heavy gauge resilient wire including three spaced portions adapted to detachably engage in inwardly opening channels of a molding strip for detachably securing said anchoring member to the molding strip, said anchoring member including spaced legs embraced by the hooks of said spring clip for attaching the spring clip to the anchoring member, one of said legs of the anchoring member constituting a terminal portion of the strand and being spaced from said other leg of the anchoring member such that the hooks yieldably engage the anchoring member legs, and said first mentioned leg of the anchoring member being sprung toward the other anchoring member leg to allow the clip legs to be sprung toward one another and for normally holding the clip legs spread, two of said spaced portions being positioned at the ends of said other leg and the other spaced portion being located remote from said first mentioned spaced portions, and said strand including a part adjustably and yieldably supporting the last mentioned spaced portion relative to the first mentioned spaced portions.

References Cited in the file of this patent

UNITED STATES PATENTS

| | | |
|---|---|---|
| 2,192,344 | Fernberg | Mar. 5, 1940 |
| 2,659,950 | West | Nov. 24, 1953 |
| 2,784,471 | Bedford | Mar. 12, 1957 |
| 2,879,569 | Poupitch | Mar. 31, 1959 |

FOREIGN PATENTS

| | | |
|---|---|---|
| 821,855 | Great Britain | Oct. 14, 1959 |